J. Robinson.
Revolving Rake.

Nº 42309. Patented Apr. 12, 1864.

Witnesses.
Jno. J. Halsted.
Geo. H. Gregory.

Inventor.
John Robinson
by his attorney
T. Bakewell

UNITED STATES PATENT OFFICE.

JOHN ROBINSON, OF LAWRENCE COUNTY, PENNSYLVANIA.

IMPROVEMENT IN HORSE-RAKES.

Specification forming part of Letters Patent No. 42,309, dated April 12, 1864.

*To all whom it may concern:*

Be it known that I, JOHN ROBINSON, of the county of Lawrence and State of Pennsylvania, have invented a new and useful Improvement in Hay-Rakes; and I do hereby declare the following to be a full, clear, and exact description thereof, reference being had to the annexed drawings, forming part of this specification, in which—

Figure 1:
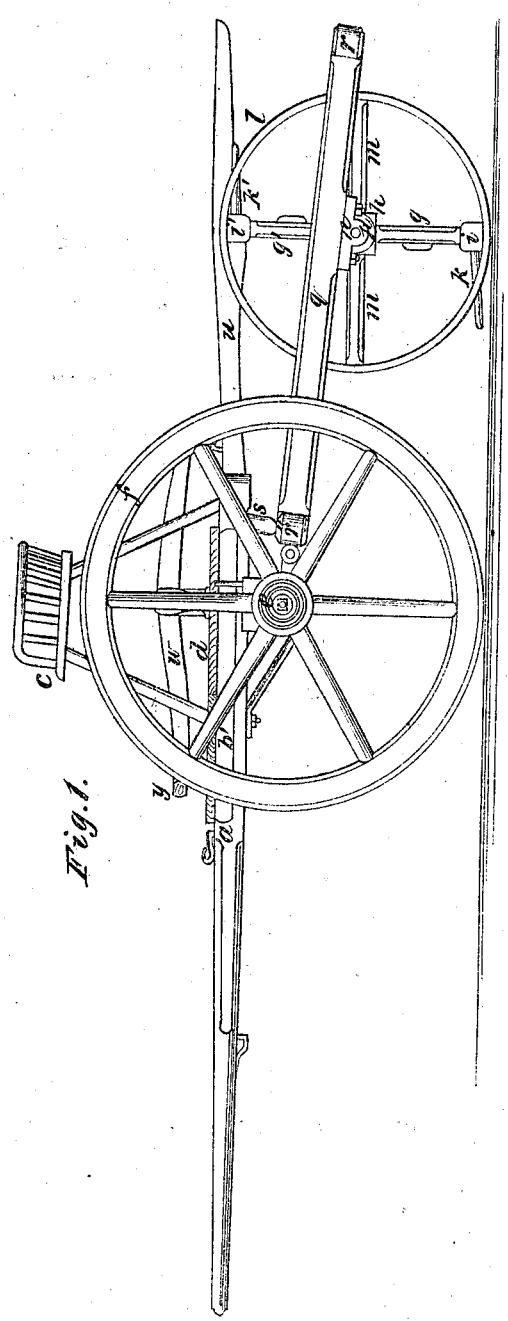
Figure 2:
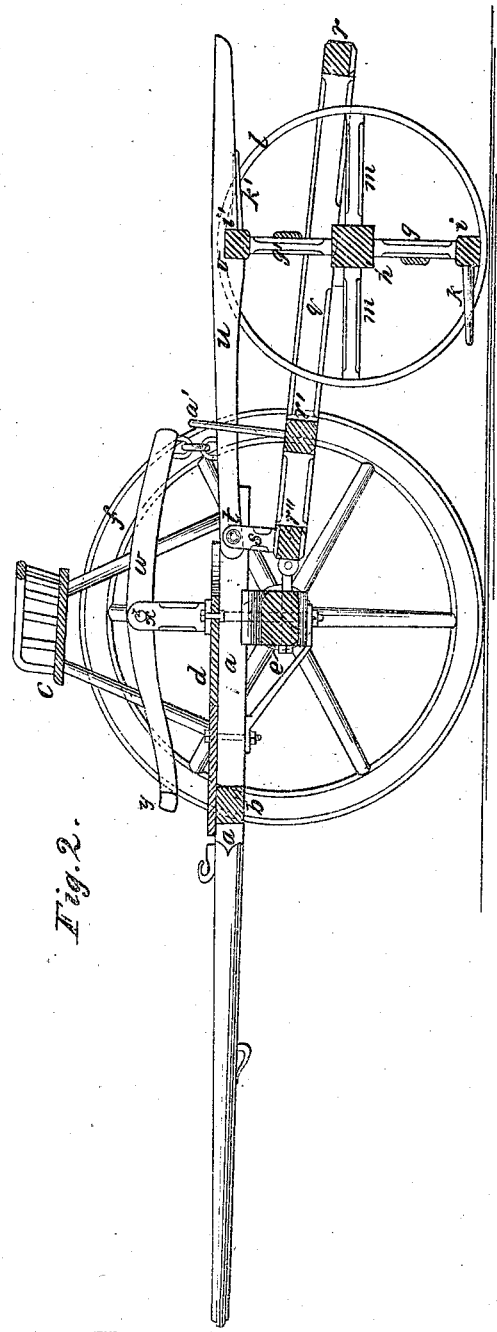

Figure 1 is a side view of my improved hay-rake. Fig. 2 is a longitudinal section through the rake midway from each side.

In each of the figures like letters of reference denote similar parts of my machine.

To enable others skilled in the art to construct and use my improved hay-rake, I will proceed to describe its construction and operation.

In the drawings, $a$ is the frame-work of the carriage, consisting of two shafts connected together by the cross-piece $b$, and extending backward far enough to form a platform to support the raker-seat $c$, and also connected at the rear end by another cross-piece. The platform under and in front of the raker-seat $c$ is floored with boards $d$, which give additional staunchness to the frame. Below the platform, and under the raker-seat $c$, is the axle-tree $e$, to which is attached at each end an ordinary cart-wheel, $f$.

The rake consists of two sets of bars, $g\ g'$, set at right angles to a central horizontal cross-bar, $h$, the bars $g\ g'$ in either side of the cross-bar $h$ being in the same right line. The bars $g\ g'$ in both sets are mortised at their outer extremities into a horizontal strip, $i\ i'$, the strips $i$ at the ends of the bars $g$ and the strips $i'$ at the end of the bars $g'$ being equidistant from the central cross-bar, $h$. From the cross-bar $g$ extend nearly at right angles thereto, and at short intervals apart, a number of prongs or tines, $k$, by which the hay or grass is gathered, the tines $k$ being long enough to hold a considerable quantity of hay or grass, which is prevented from falling out backward by the bars $g$, which are placed sufficiently close together for that purpose. From the outer extremity of the other set of bars, $g'$, extend a number of tines, $k'$, similarly arranged in relation to their bar $g$ as are the tines $k$ to their bar. When the bars $g\ g'$ are in a vertical position, as shown in the drawings, Figs. 1 and 2, the lower set of tines, $k$, point forward in the direction in which the rake is to be moved, but with their points inclining slightly downward, while the upper set of tines, $k'$, extend in the opposite direction, or rearward. At each end of the rake-bars $g\ g'$ is a circular hoop or tire, $l$, the extremities of the horizontal rake-bars $g\ g$; resting on and being attached to the inner circumference of the tire, so that the central horizontal bar, $h$, forms the axle of a wheel of which the outer side rake-bars, $g\ g'$, are spokes. Other spokes, $m\ m$, are also added and mortised into the central bar $h$, to keep the tire $l$ in shape. From each end of the central cross-bar, $h$, extends a pin or journal, $n$, each of which works in a journal box or bearing, $p$, attached to the hanging rake-frame. The tires $l$ are of such diameter that when the rake is in use they rest on the ground, thus causing the rake-wheel to revolve when left free to do so, as hereinafter described.

The rake-wheel, constructed as just described, is attached by the journals $n$ on either side to the hanging frame, composed of two parallel sides pieces, $q$, connected together by three cross-pieces, $r\ r'\ r''$. (See Fig. 2.) The rake-frame has at its front end two or three short upright posts, $s\ s$—one at each side and one in the middle—firmly attached at right angles to the hanging frame. The upper extremity of each of the posts $s\ s$ is pivoted at $t$ to the rear end of the side pieces, $a\ a$, of the carriage. The other end of the rake-frame is free, so that when the tires $l$ of the rake-wheel rest on the ground the hanging rake-frame will rise and fall with any inequality of the ground and preserve the tines $k$ of the lower set of rakes at a uniform distance from its surface. To the frame of the carriage, about midway from either side, is pivoted at $t$ a catch-bar, $u$, which extends from the point $t$ backward over the top of the rake-frame. It has a square notch cut in its under side at $v$, Fig. 2, this notch being of such size that the cross-bars $i'$, whichever may be uppermost, of the rake-frame will enter it. When the catch-bar rests on top of the rake-frame and the rake-wheel is revolved, so soon as the rake-bars $g\ g'$ assume a vertical position, as in the drawings, the upper cross-bar, $i$, will enter the notch, which at once arrests the motion of the rake-wheel and holds it firmly in the position (shown in Figs. 1 and 2) required for raking hay. So soon as the lower rake-tines are sufficiently loaded with hay the catch-bar is momentarily raised, when the rake-wheel will at once perform a half-revolution, discharging the contents of the lower rake-tines in a heap on the sward, and as soon as the other set of tines reach the ground the catch-bar engages the upper rake-bar $g'$ and holds the rake-wheel in position. This operation is repeated as often as the lower rake-tines become sufficiently loaded.

The catch-bar is operated, as just described, by means of a lever, $w$, which has its fulcrum in a post, $x$, under the raker-seat, the forward end of the lever having a cross-piece, $y$, just in front of the raker-seat, in a convenient position to be operated by the foot of the person sitting in the raker-seat. The other end of the lever $w$ is attached by a link and staples to the catch-bar a short distance back of the pivot $t$.

When it is desired to raise the hanging rake-frame entirely off the ground, so that the carriage may be driven without operating the rake, it is done by drawing out the pin $z$ at the fulcrum of the lever $w$ in the post $x$, which the driver can easily do from his seat, the pin $z$ being attached to the post $x$ by a short chain, so as not to be lost. The lever $w$, resting in the crotch of the post $x$, is then pushed forward by the feet of the driver, which raises the catch-bar $u$. As the catch-bar $u$ is pivoted to the carriage-frame at $t$ and is not attached to the hanging rake-frame, its elevation would not raise the hanging rake-frame were it not that an iron loop, $a'$, is attached to the middle cross-piece, $r'$, of the hanging frame, through which loop the catch-bar $u$ is passed, the loop being just long enough to permit of the catch-bar being slightly raised to disengage the rake-wheel from the notch $v$; but when the catch-bar is raised up higher by drawing the lever forward the top of the loop $a'$ rests on the catch-bar and causes the hanging rake-frame to be sufficiently elevated to raise the tires $l$ of the rake-wheel entirely off the ground. A sliding bar, $b'$, placed on one side of the carriage-frame, (see Fig. 1,) is then pushed back under the rear cross-piece, $r''$, of the hanging frame, and thus holds it up. The sliding bar $b$ may be operated by one foot of the driver, while with the other, pressed against the cross-piece $y$ at the forward end of the lever $w$, he presses the lever forward and elevates the rake-frame, as before described. Thus the whole operation of raising the hanging frame and lowering it again may be performed by the driver without leaving his seat.

What I claim as my invention, and desire to secure by Letters Patent, is—

1. The use of the revolving rake-wheel, provided with two sets of tines to operate alternately and attached to the carriage by a hanging frame, substantially as described.

2. The use of the lever for operating the catch-bar, in connection with the sliding bar for elevating and holding up the rake-frame when the rake is not in use, substantially as described.

In testimony whereof I, the said JOHN ROBINSON, have hereunto set my hand.

JOHN ROBINSON.

Witnesses:
 F. T. DAVIS,
 W. H. BLACK.